United States Patent
Huelke et al.

(10) Patent No.: US 9,266,477 B2
(45) Date of Patent: Feb. 23, 2016

(54) STAND ALONE PUSH IN COAT HOOK

(71) Applicant: Ford Global Technologies, LLC, Dearborn, MI (US)

(72) Inventors: David Huelke, Milan, MI (US); Keith William Jenkins, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 118 days.

(21) Appl. No.: 14/248,613

(22) Filed: Apr. 9, 2014

(65) Prior Publication Data

US 2015/0291105 A1   Oct. 15, 2015

(51) Int. Cl.
*B60R 3/02* (2006.01)
*B60R 7/10* (2006.01)
*B60N 3/02* (2006.01)

(52) U.S. Cl.
CPC .... *B60R 7/10* (2013.01); *B60N 3/02* (2013.01)

(58) Field of Classification Search
CPC .............. B60R 7/10; B60R 2011/0005; B60R 2011/005; B60R 2011/0042; B60R 2011/0003
See application file for complete search history.

(56) References Cited

U.S. PATENT DOCUMENTS

| | | | | |
|---|---|---|---|---|
| 4,660,789 A * | 4/1987 | Putnam | ................. | B60K 37/04 248/27.3 |
| 4,993,668 A * | 2/1991 | Inamura | ................. | B60K 37/04 248/27.3 |
| 5,226,569 A * | 7/1993 | Watjer | ................. | B60R 7/10 211/123 |
| 5,366,127 A * | 11/1994 | Heinz | ................. | B60R 7/10 16/284 |
| 5,560,575 A * | 10/1996 | Krysiak | ................. | F16B 19/1081 248/222.12 |
| 5,625,921 A * | 5/1997 | Smith | ................. | B60N 3/02 16/445 |
| 5,769,294 A * | 6/1998 | Heinz | ................. | B60R 7/02 224/544 |
| 6,065,657 A * | 5/2000 | Fischer | ................. | B60R 7/10 224/313 |
| 6,076,716 A * | 6/2000 | Reyes | ................. | A47G 25/32 223/94 |
| 6,397,435 B1 * | 6/2002 | Gosselet | ................. | B60N 3/023 16/438 |
| 6,422,644 B1 | 7/2002 | Miller et al. | | |
| 6,607,233 B1 | 8/2003 | Beaver et al. | | |
| 6,863,331 B2 | 3/2005 | Beaver et al. | | |
| 7,837,248 B2 | 11/2010 | Nedelman | | |
| 2003/0074767 A1 * | 4/2003 | Chang | ................. | B60N 3/023 16/438 |
| 2004/0124317 A1 * | 7/2004 | Wallaker | ................. | B60R 11/02 248/27.1 |
| 2004/0124330 A1 * | 7/2004 | Tanaka | ................. | B60R 7/02 248/339 |
| 2007/0046054 A1 | 3/2007 | Hinman et al. | | |
| 2008/0169667 A1 * | 7/2008 | Siniarski | ................. | B60N 3/002 296/37.8 |
| 2010/0077571 A1 * | 4/2010 | Nemoto | ................. | B60R 7/10 24/267 |
| 2014/0021735 A1 * | 1/2014 | Huelke | ................. | B60J 3/023 296/97.9 |
| 2014/0034692 A1 * | 2/2014 | Huelke | ................. | B60R 7/10 224/313 |

FOREIGN PATENT DOCUMENTS

DE            4333479 A1    4/1994

* cited by examiner

*Primary Examiner* — Brian D Nash
(74) *Attorney, Agent, or Firm* — Vichit Chea; Price Heneveld LLP

(57) ABSTRACT

An accessory attachment assembly for a vehicle interior includes a mounting bracket having a mounting aperture and first and second retention tabs pivotally coupled to the mounting bracket at the mounting aperture. A hook member includes a hook portion and an open frame portion. The open frame portion is releasably received in the mounting aperture of the mounting bracket in assembly. The first and second retention tabs are operably coupled to the open frame portion of the hook member as the open frame portion is received in the mounting aperture. A release aperture is disposed on one of either the first and second retention tabs and is configured to receive a tool for releasing the first and second retention tabs from the open frame portion of the hook member to release the hook member from the mounting bracket.

18 Claims, 9 Drawing Sheets

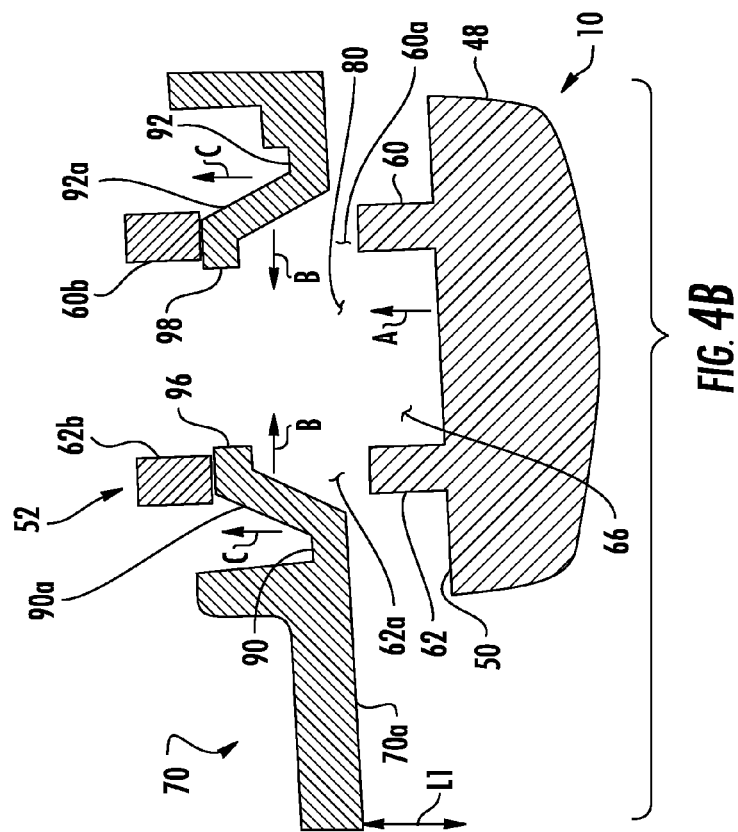
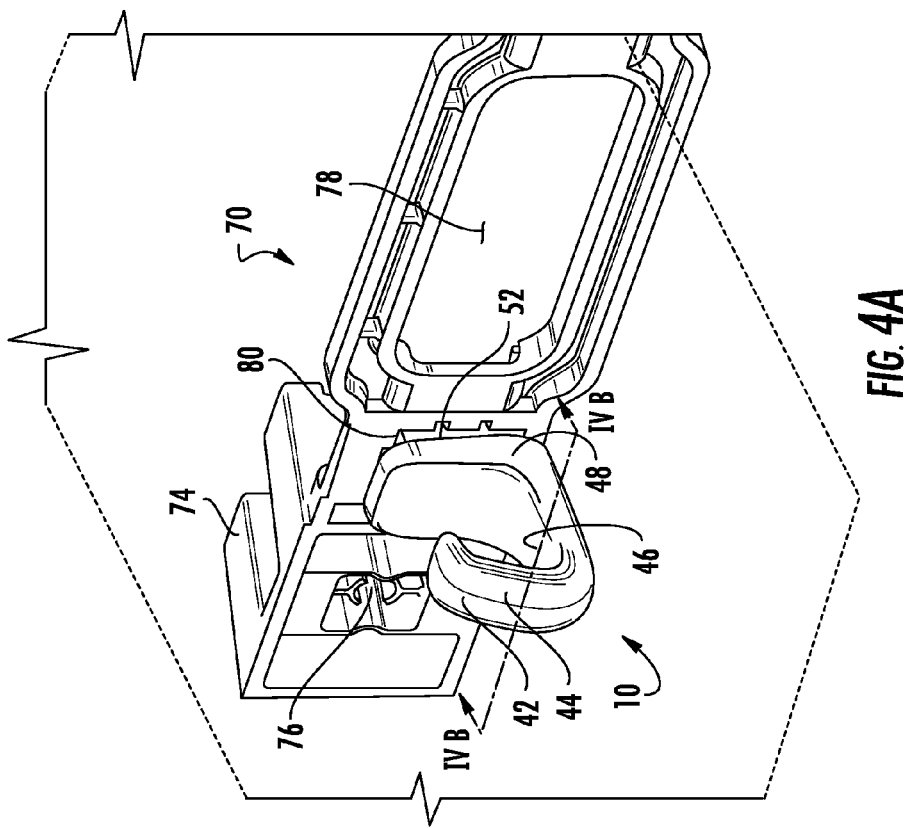
FIG. 4B
FIG. 4A

STAND ALONE PUSH IN COAT HOOK

FIELD OF THE INVENTION

The present invention generally relates to a garment hanger for a vehicle interior, and more specifically, to a stand-alone push-in garment hanger or coat hook and associated mounting assembly.

BACKGROUND OF THE INVENTION

Coat hooks, or garment hangers, are often mounted directly into sheet metal or a sheet metal bracket using a screw and clip combination. Such coat hooks are not integrated into a grab handle assembly and have the tendency to rock or rotate as mounted to the sheet metal vehicle frame. The clip used to mount the coat hook typically rocks within the aperture in the sheet metal which leads to a perception of poor quality in the coat hook construction and mounting. Further, such a coat hook calling for a screw, a steel fastener clip and a plastic coat hook is a costly execution with regards to installation.

As such, a coat hook that is easily installed having anti-rotational features is desired.

SUMMARY OF THE INVENTION

One aspect of the present invention includes an accessory attachment assembly for a vehicle interior having a mounting bracket with a mounting aperture disposed therethrough. The mounting bracket is coupled to a vehicle panel in assembly. First and second retention tabs are pivotally coupled to the mounting bracket at the mounting aperture. A hook member includes a hook portion and an open frame portion, wherein the open frame portion is releasably received in the mounting aperture of the mounting bracket. The first and second retention tabs are operably coupled to the open frame portion of the hook member as received in the mounting aperture of the mounting bracket. A release aperture is disposed on either the first or second retention tab and is configured to receive a tool for releasing the first and second retention tabs from the open frame portion of the hook member.

Another aspect of the present invention includes an accessory attachment assembly for a vehicle interior having a mounting bracket with a mounting aperture disposed therethrough. One or more retention tabs are disposed on the mounting bracket. Each retention tab includes a free end disposed over the mounting aperture. A stand-alone hook member includes an open frame portion that is closely received in the mounting aperture of the mounting bracket. The retention tabs releasably retain the open frame portion of the stand-alone hook member in the mounting aperture of the mounting bracket.

Yet another aspect of the present invention includes an accessory attachment assembly for a vehicle interior having a mounting bracket with a mounting aperture disposed therethrough. The mounting bracket may be operably coupled to a vehicle panel in assembly. First and second retention tabs are extend outwardly from the mounting bracket and are flexibly resilient over the mounting aperture. A hook member includes a hook portion at a first end and a standoff portion at an opposite second end. The standoff portion includes a window disposed therethrough. The standoff portion is received in the mounting aperture of the mounting bracket, such that the first and second retention tabs are releasably coupled to opposite sides of the window of the standoff portion to retain the hook member on the mounting bracket. A release aperture is disposed on either the first or second retention tab and provides access to the first and second retention tabs for releasing the first and second retention tabs from the window of the standoff portion.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is a perspective view of the hook member of FIG. 2 installed in the mounting bracket of FIG. 3A.

FIG. 4B is a cross-sectional view of the hook member and mounting bracket taken along line IVB of FIG. 4A;

DETAILED DESCRIPTION OF THE PREFERRED EMBODIMENTS

Figure 1:
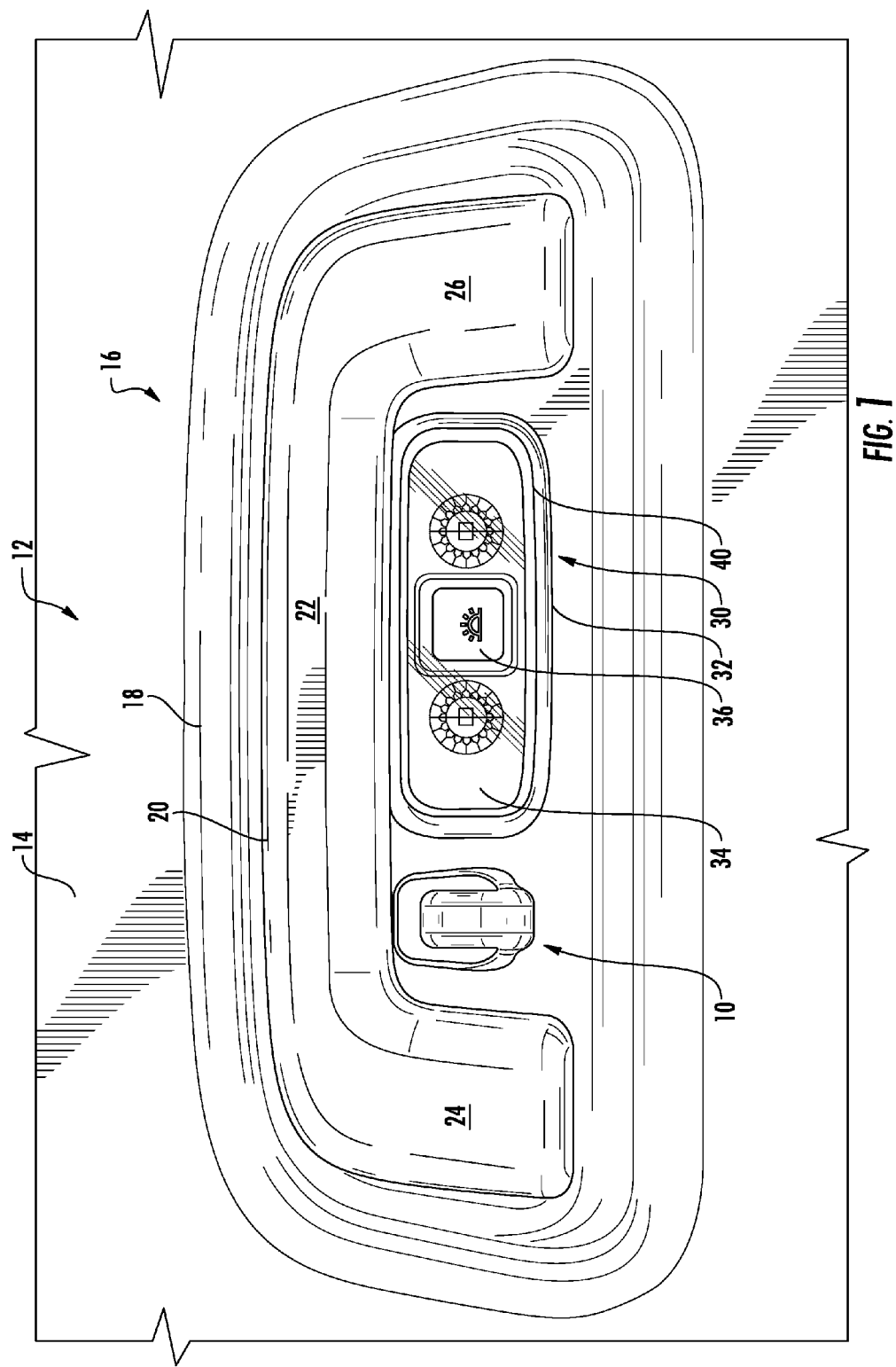
FIG. 1 is a front perspective view of a hook member and grab handle assembly installed in a vehicle interior.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, the reference numeral 10 generally designates a hook member installed within the passenger cabin 12 of a vehicle along a head liner portion 14 of the vehicle. The hook member 10 is incorporated into a grab handle assembly 16 which, in the embodiment of FIG. 1, includes an exterior housing 18, and a grab handle 20, which is pivotally coupled thereto. The grab handle 20 includes a main body portion 22 and first and second leg portions 24, 26 which extend from the main body portion 22, and which are further pivotally coupled to the exterior housing 18. As further shown in the embodiment of FIG. 1, an interior light assembly 30 is disposed within a housing 32. A lens or cover portion 34 includes an activation button 36 disposed thereon. As shown in FIG. 1, the light assembly 30 is received in an access aperture 40 disposed in the exterior housing 18 of the grab handle assembly 16.

Figure 2:
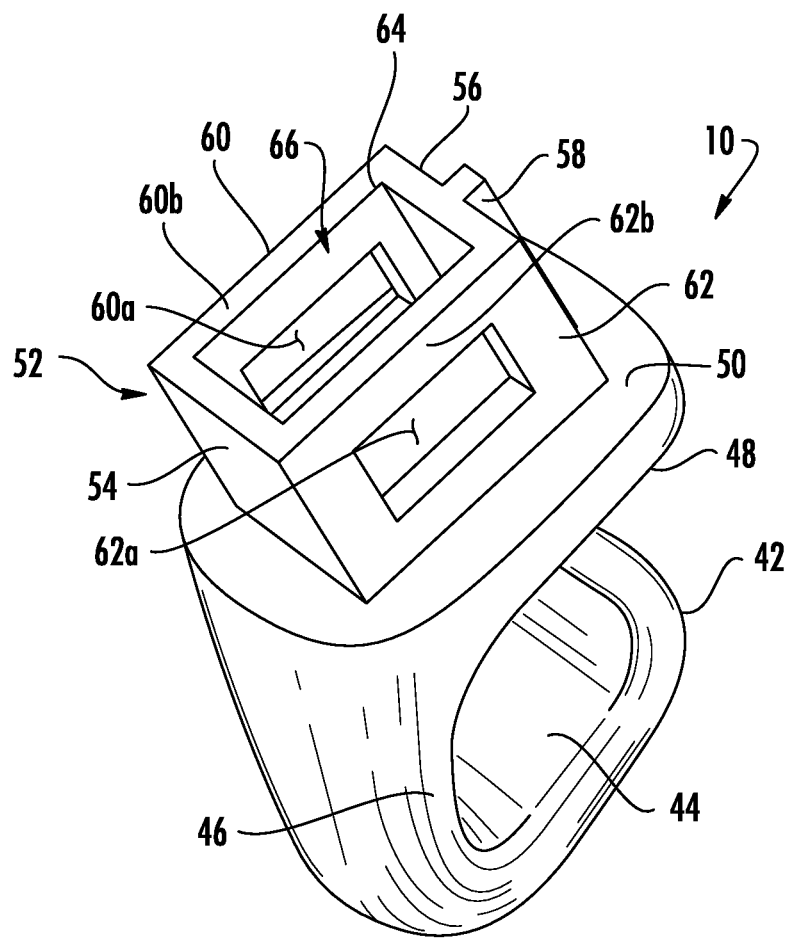
FIG. 2 is a bottom perspective view of a stand-alone hook member.

As shown in FIG. 2, the hook member 10 includes a hook portion 42 having an upwardly turned distal end 44 connecting to an outwardly extending support portion 46. The outwardly extending support portion 46 terminates in a body portion 48 having a generally planar abutment surface 50. In assembly, the abutment surface 50 is adapted to abut the exterior housing 18 of the grab handle assembly 16. Further, extending outwardly from the abutment surface 50 is an open frame portion 52 which defines a standoff feature for the hook member 10. The open frame portion 52 includes a bottom wall 54 and a top wall 56, wherein the top wall 56 includes an anti-rotational engagement tab 58 extending upwardly therefrom. The engagement tab 58 cooperates with a mounting bracket as further described below. The bottom wall 54 and top wall 56 of the open frame 52 are spaced apart and interconnected by side walls 60, 62 having apertures 60a, 62a disposed therethrough, respectively. The open frame portion 52 is considered "open" as a rear portion of the open frame portion 52 defines an opening 64 to a cavity 66, wherein the cavity 66 is defined by the bottom wall 54, the top wall 56, the side walls 60, 62 and abutment surface 50. In the embodiment shown in FIG. 2, the open frame portion 52 defines a substantially rectangular shaped standoff feature which provides anti-rotational features with its cubed configuration for the hook member 10 in assembly. While the open frame portion 52 is shown in FIG. 2 as a rectangular member, it is contemplated that any number of geometries can be used to create the open frame portion 52 of hook member 10.

Thus, as shown, hook member 10 is a standalone one-piece hook member that is contemplated to be made of polymeric materials in an injection molding process, or other like formation process.

Figure 3A:
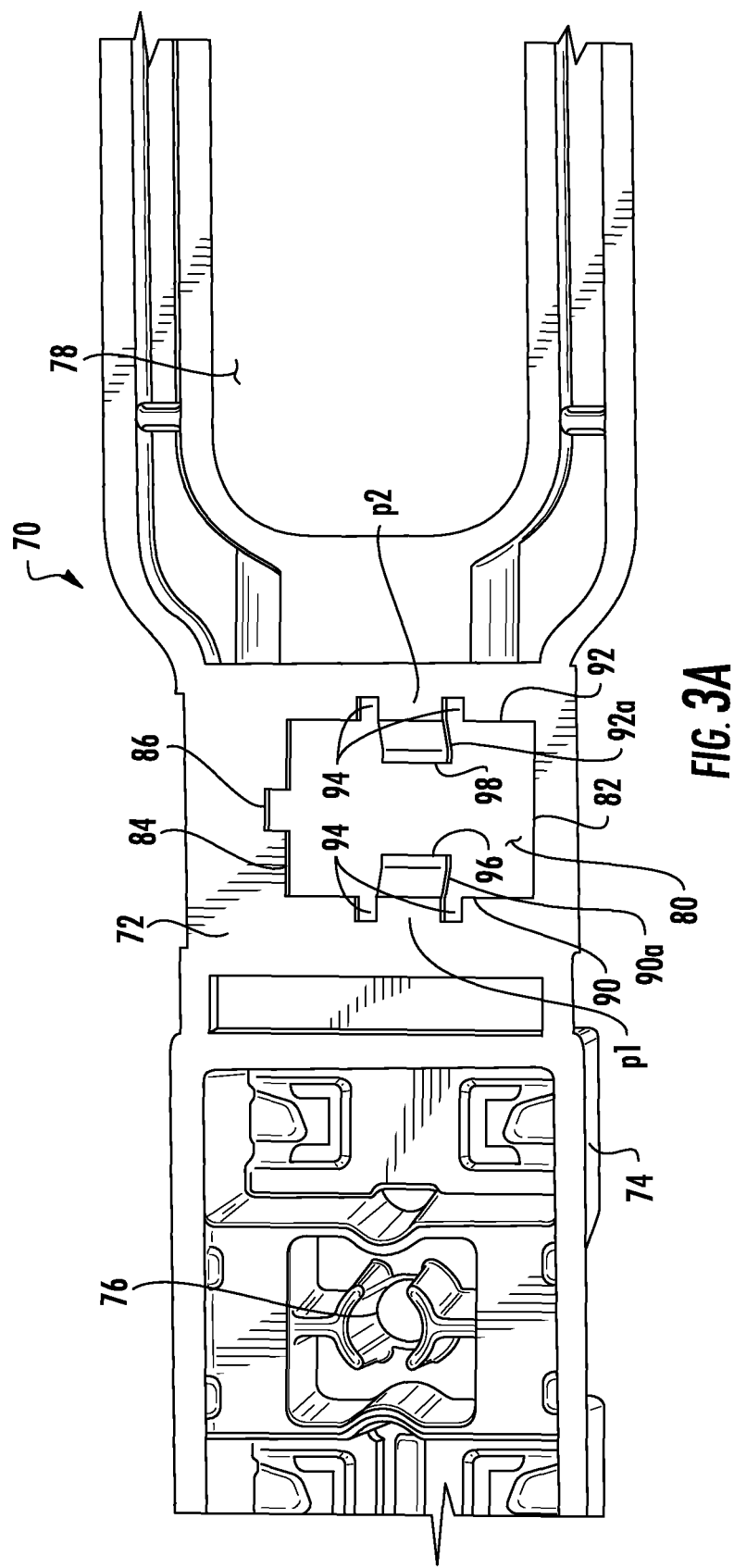
FIG. 3A is a fragmentary front perspective view of a mounting bracket.

Referring now to FIG. 3A, a mounting bracket 70 is shown having a body portion 72 with a handle mounting portion 74 having an aperture 76 disposed therethrough, for receiving a screw or other like fastener to pivotally connect a leg, such as legs 24, 26 described above with reference to FIG. 1, in a pivotal manner on the exterior housing 18 of the grab handle assembly 16. The body portion 74 further includes an access aperture 78, in which the light assembly 30 is received and coupled thereto. While the mounting bracket 70 shown in FIG. 3A is a fragmentary image, it is contemplated that a second grab handle mounting portion, such as grab handle mounting portion 74, is disposed on the opposite end of access aperture 78, such that both legs 24, 26 of grab handle 20, can be coupled to the mounting bracket 70. The mounting bracket 70 defines a spacer within the grab handle assembly 16 for coupling the grab handle 20 to the exterior housing 18. As further shown in FIG. 3A, the mounting bracket 70 includes a mounting aperture 80 which is defined by a bottom end 82, a top end 84 having a generally centrally disposed notch 86, wherein the bottom end 82 and top end 84 are spaced apart and interconnected by side portions 90, 92 which include inwardly extending retention tabs 90a and 92a, respectively. In the embodiment shown in FIG. 3A, the first and second retention tabs 90a, 92a have relief portions 94 disposed above and below the retention tabs 90a, 92a, such that the retention tabs 90a, 92a are flexibly resilient tabs having free ends 96, 98 that are disposed over the mounting aperture 80. The free ends 96, 98 of the retention tabs 90a, 92a are said to be disposed over the mounting aperture 80 in that the retention tabs 90a, 92a extend into the mounting aperture 80 for coupling to the hook member 10. The retention tabs 90a, 92a generally pivot from the body portion 72 at pivot points P1, P2, respectively, in a living hinge manner. The retention tabs 90a, 92a are adapted to move between engaged and disengaged positions with the coat hook member 10 as further described below.

Figure 3B:
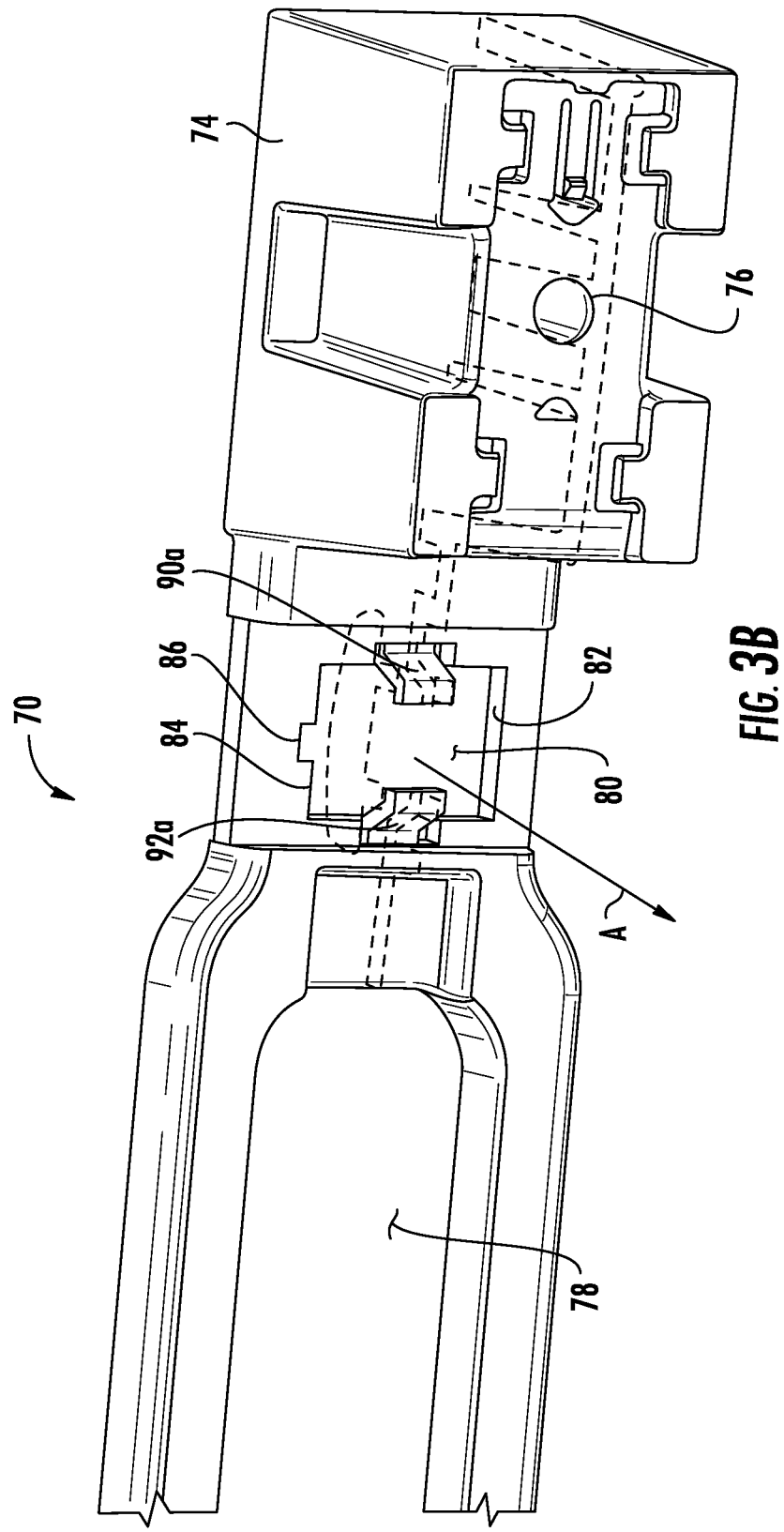
FIG. 3B is a fragmentary rear perspective view of the mounting bracket of FIG. 3A.

Referring now to FIG. 3B, the mounting bracket 70 is shown from a rearview, where it is clear that the retention tabs 90a, 92a outwardly extend from the mounting aperture 80. In FIG. 3B, the retention tabs 90a, 92a are shown in the engaged position for which the retention tabs 90a, 92a retain the hook member 10 as horizontally received in the mounting aperture 80 in a path as indicated by arrow A. As further shown in FIG. 3B, the grab handle mounting portion 74 provides a standoff or spacer function to the mounting bracket 70, such that there is adequate room outboard of mounting aperture 80 for receiving the open frame 52 of the hook member 10 as further described below.

Referring now to FIG. 4A, the hook member 10 is shown coupled to the mounting bracket 70 by the open frame portion 52 of the hook member 10 being received in mounting aperture 80 of mounting bracket 70. The open frame portion 52 is received in an anti-rotational manner in the mounting aperture 80, as both the mounting aperture 80 and open frame portion 52 have a generally rectangular configuration, such that the open frame portion 52 is closely received within mounting aperture 80 as further described below.

Referring now to FIG. 4B, a cross-sectional view of the hook member 10 is shown as received in mounting aperture 80 of the mounting bracket 70. As shown in FIG. 4B, retention tabs 90a, 92a extend outwardly from sides 90, 92 in directions as indicated by arrows C, and also extend towards one another in the direction as indicated by arrows B, such that the free ends 96, 98 of the retention tabs 90a, 92a are clearly disposed over the mounting aperture 80. The free ends 96, 98 are shown in abutting engagement with end portions 60b, 62b, of the open frame portion 52 of hook member 10. Thus, as shown in FIG. 4B, the retention tabs 90a, 92a are received within the apertures 62a, 60a, respectively. Thus, as shown in FIG. 4B, the retention tabs 90a, 92a are in the engaged position with the open frame portion 52 of the hook member 10. As coupled to the mounting bracket 70, the hook member 10 defines a space L1 disposed between a surface 70A of the mounting bracket 70 and the abutment surface 50 of the hook member 10. It is contemplated that the exterior housing 18 of the grab handle assembly 16 is configured to fit within the spacing L1 for providing a snug-fit between the mounting bracket 70 and the hook member 10. In this way, it is contemplated that the hook member 10 is received in mounting aperture 80 of the mounting bracket 70 in a push-in snap-fit configuration with the retention tabs 90a, 92a engaging the open frame portion 52.

Figure 4C:
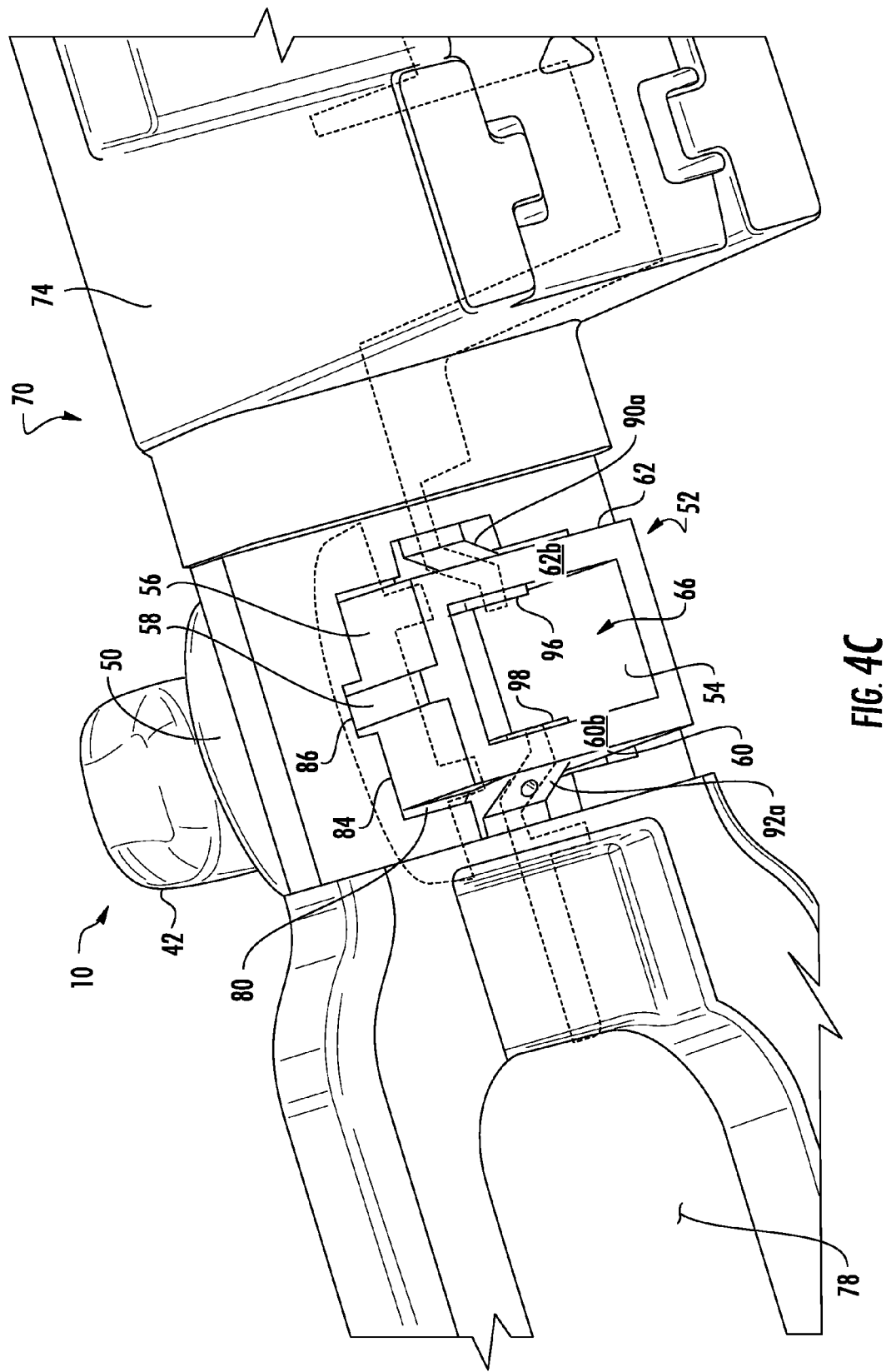
FIG. 4C is a rear perspective view of the hook member and mounting bracket of FIG. 4A.
Figure 4D:
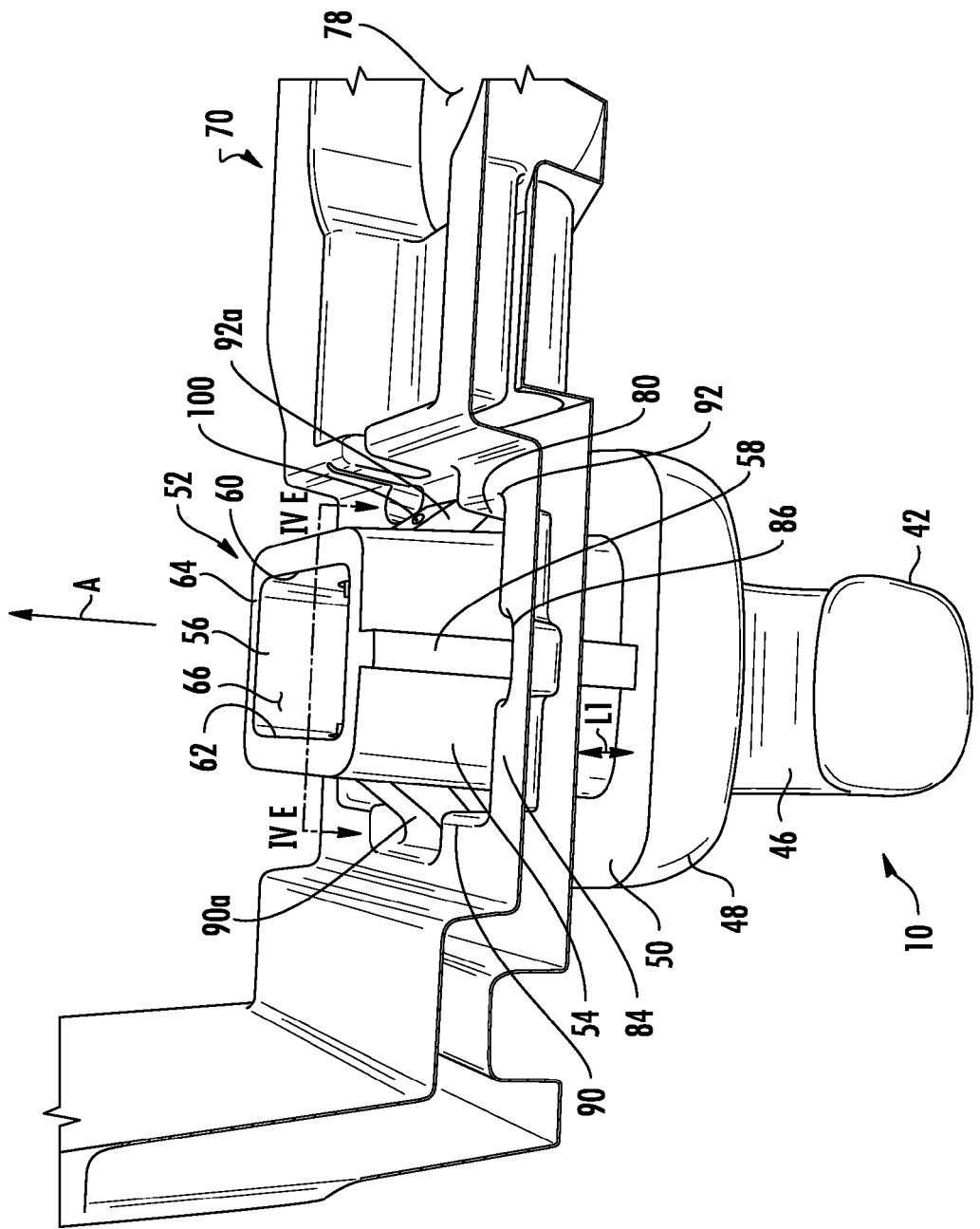
FIG. 4D is a top perspective view of the hook member and mounting bracket of FIG. 4C.

Referring now to FIGS. 4C and 4D, the hook member 10 is shown received within mounting aperture 80 of the mounting bracket 70. The open frame portion 52 is shown extending through the mounting aperture 80 such that the retention tabs 90a, 92a are received within the apertures 62a, 60a, such that the free ends 96, 98 are in abutting relationship with end portions 62b and 60b, respectively. As shown in FIG. 4C, the engagement tab 58 disposed on the top wall 56 of the open frame portion 52 is received within notch 86 of top end 84 of mounting aperture 80. In this way, the engagement tab 58 serves to properly locate the hook member 10 as the open frame portion 52 is inserted into the mounting aperture 80. As further shown in FIG. 4C, the configuration of the open frame portion 52 mirrors the configuration of mounting aperture 80, such that the open frame portion 52 is closely received in mounting aperture 80 in an anti-rotational manner. Thus, the hook member 10 is coupled to the mounting bracket 70, such that the hook portion 42 of the hook member 10 will not rotate within the grab handle assembly 16, as shown in FIG. 1, when engaged by a user. As best shown in FIG. 4D, the spacing L1 exists between surface 70A of the mounting bracket 70 and abutment surface 50 of the hook member 10 in which the exterior housing 18, shown in FIG. 1, is disposed. As further shown in FIG. 4D, a release aperture 100 is disposed on retention tab 92a which is used to release the hook member 10 from the mounting bracket 70 as further described below.

Figure 4E:
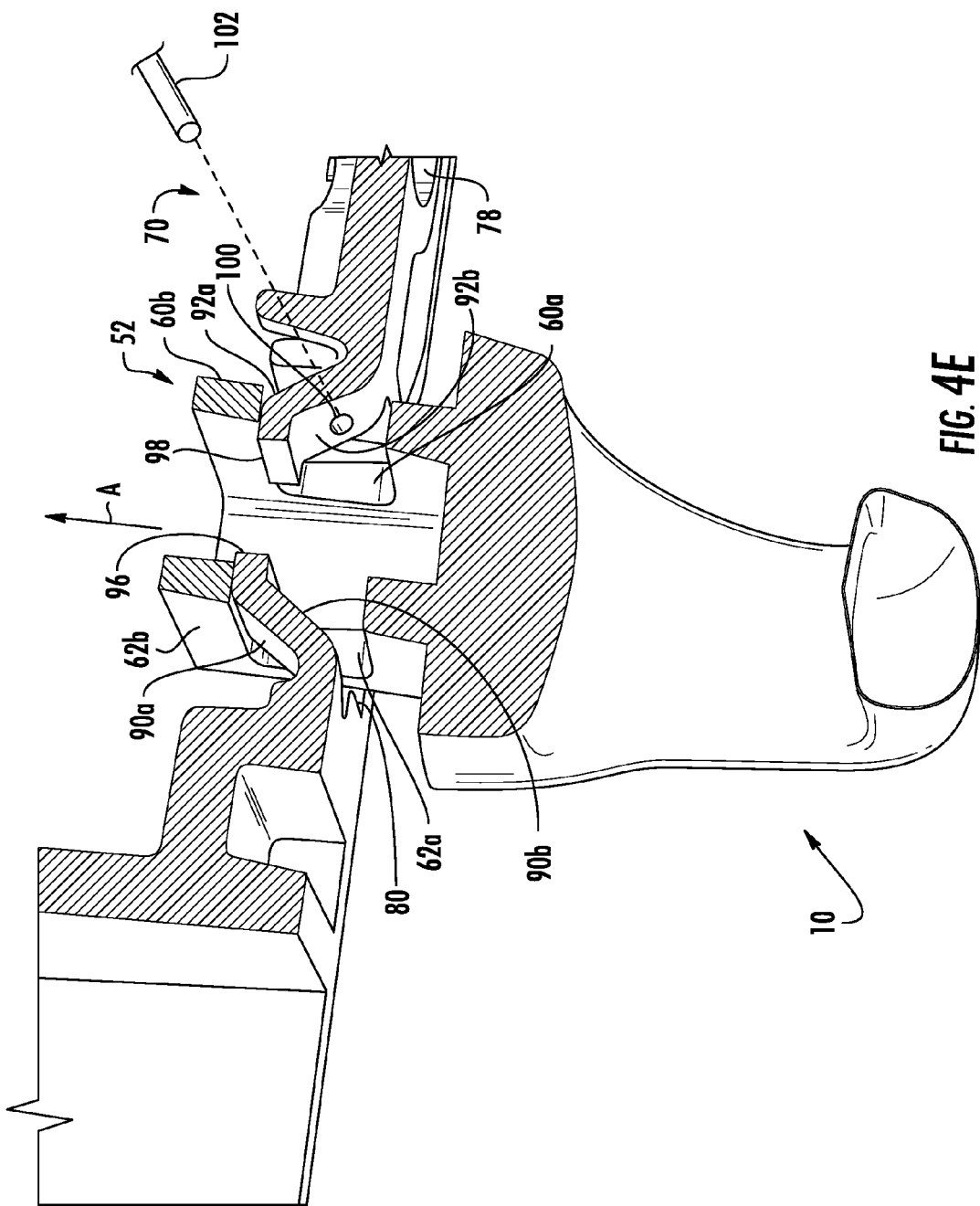
FIG. 4E is a cross-sectional view of the hook member and mounting bracket taken along line IVE of FIG. 4D.

Referring now to FIG. 4E, the open frame portion 52 of the hook member 10 is again shown received in mounting aperture 80 of mounting bracket 70 with retention tabs 90a, 92a in the engaged position with end sections 62b and 60b, respectively, of the open frame portion 52. As such, the retention tabs 90a, 92a are engaged with apertures 62a and 60a of side walls 62, 60 of the open frame portion 52. As further shown in FIG. 4E, the retention tabs 90a, 92a include angled body portions 90b, 92b which culminate in free ends 96, 98, respectively. As further shown in FIG. 4E, a tool 102 is configured for insertion into release aperture 100 disposed on the body portion 92b of retention tab 92a. The tool 102 may be a pin or other like structure that can be inserted into release aperture 100 when a user wishes to remove the hook member 10 from the mounting bracket 70. In this way, the hook member 10 is releasably coupled to the mounting bracket 70, such that the hook member 10 can be replaced should the hook portion 42 of the hook member 10 become damaged. As horizontally inserted into the mounting aperture 80, the open frame portion 52 of the hook member 10 is easily coupled with the mounting bracket 70 via the engagement of the retention tabs 90a, 92a with the open frame portion 52 as described above. Further, when the light assembly 30, shown in FIG. 1, is removed from the grab handle assembly 16, access aperture 78 is open to allow access to release aperture 100 using the tool 102. The tool 102 is used to release the open frame portion 52 from the retention tabs 90a, 92a as further described below.

Figure 4F:
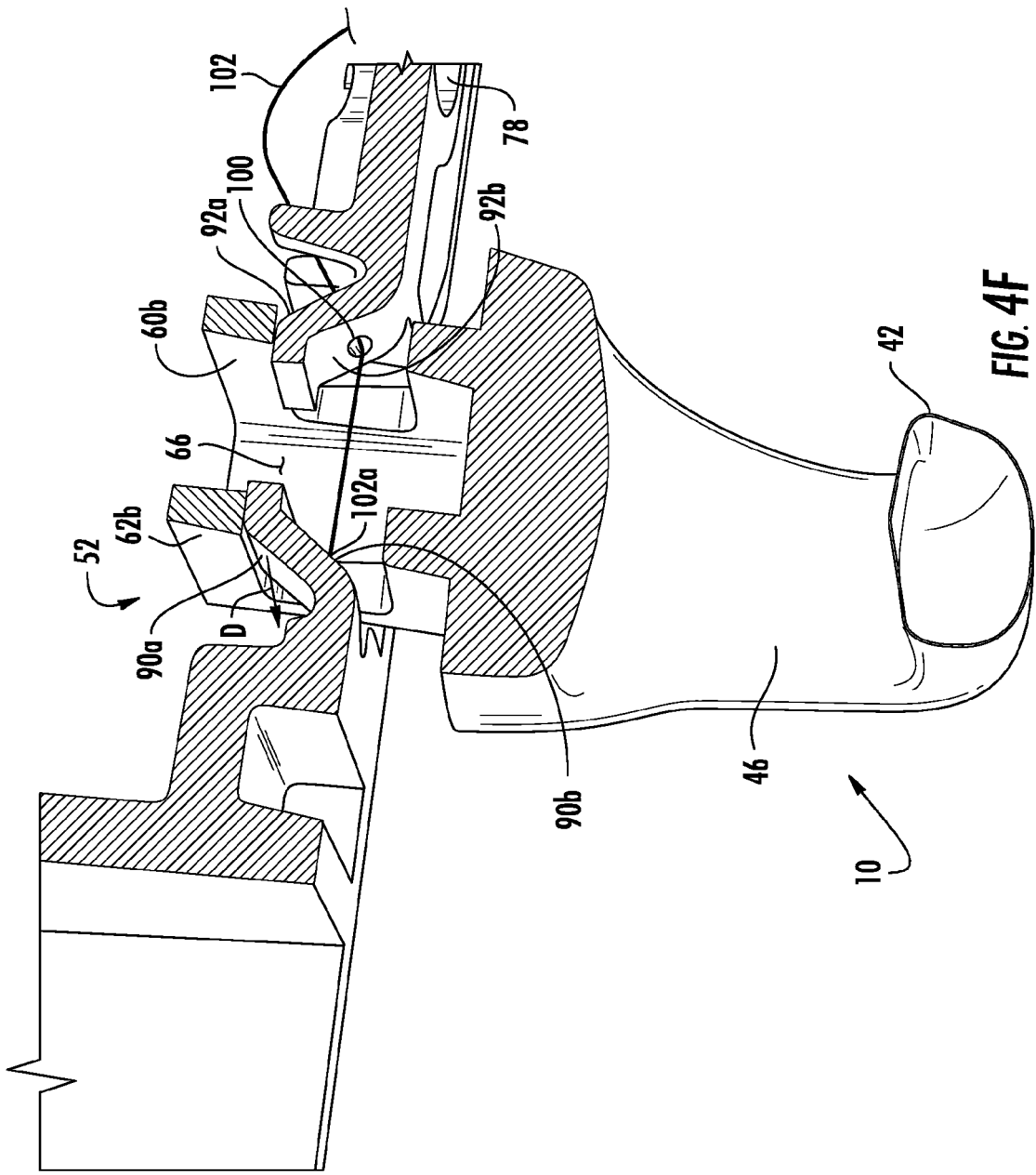
FIG. 4F is a cross-sectional view of the hook member and mounting bracket of FIG. 4E showing a tool used to release the hook member from the mounting bracket.

Referring now to FIG. 4F, the tool 102 is shown extending through access aperture 78 to the release aperture 100 disposed in the body portion 92b of retention tab 92a. The tool 102 is further shown extending across the cavity 66 of the open frame portion 52 of hook member 100 to engage the body portion 90b of retention tab 90a. As the end portion 102a of the tool 102 abuts the body portion 90b of retention tab 90a, the user can use the tool 102 to push or urge retention tab 90a to the disengaged position along a path as indicated by arrow D. As noted above, the retention tabs 90a, 92a are flexibly resilient, such that the end portion 102a can act on the body portion 90b of retention tab 90a to force the retention tab 90a out of engagement with end portion 62B of the open frame portion 52 of hook member 10. As retention tab 90a is moved from the engaged position to the disengaged position along the path as indicated by arrow D, a user can grasp the hook portion 42 of hook member 10 to maneuver the hook member 10 from engagement with the mounting bracket 70. In this way, the hook member 10 allows for easy installation on the mounting bracket 70 by the snap-fit engagement of the retention tabs 90a, 92a with the open frame portion 52 of hook member 10. The insertion of the hook member 10 into the mounting aperture 80 of the mounting bracket 70 is further aided by the angled body portions 90b, 92b of retention tabs 90a, 92a which move outward towards the disengaged position as the open frame portion 52 moves through mounting aperture 80. Further, hook member 10 is easily removable from mounting bracket 70 for servicing, replacement, or for reusing the hook member 10 in another installation. The hook member 10 is a non-handed one-piece hook member that can be easily used in grab handle assemblies disposed on left and right sides of a vehicle interior. Further, while identified for use in a vehicle interior, it is contemplated that the hook member 10 and mounting bracket 70 can be used in other like applications where a hook feature is desired.

It will also be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who receive this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An accessory attachment assembly for a vehicle interior, comprising:
   a mounting bracket having a mounting aperture disposed therethrough;
   first and second retention tabs pivotally coupled to the mounting bracket at the mounting aperture;

a hook member having a hook portion and an open frame portion, wherein the open frame portion is releasably received in the mounting aperture of the mounting bracket, the first and second retention tabs operably coupled to the open frame portion of the hook member as received in the mounting aperture; and a release aperture disposed on one of the first and second retention tabs, the release aperture configured to receive a tool for releasing the first and second retention tabs from the open frame portion of the hook member to release the hook member from the mounting bracket.

2. The accessory attachment assembly of claim 1, wherein the hook member is a one-piece stand-alone hook member.

3. The accessory attachment assembly of claim 2, wherein the open frame portion further includes:

a bottom wall and a top wall spaced apart from one another and interconnected by first and second sidewalls, the first and second sidewalls each having an aperture for receiving free ends of the first and second retention tabs respectively.

4. The accessory attachment assembly of claim 3, wherein the mounting aperture is defined by a top end and a bottom end which are spaced apart by sides from which the first and second retention tabs outwardly extend over the mounting aperture.

5. The accessory attachment assembly of claim 4, wherein the open frame portion comprises a substantially rectangular shaped configuration and is closely received in the mounting aperture in an anti-rotational manner.

6. The accessory attachment assembly of claim 4, wherein the top wall includes an engagement tab disposed thereon.

7. The accessory attachment assembly of claim 6, wherein the top end includes a notch configured to receive the engagement tab in assembly.

8. The accessory attachment assembly of claim 1, further including:

a grab handle assembly having an exterior housing with a grab handle coupled thereto, wherein the hook member couples to the mounting aperture through the exterior housing;

an access aperture disposed on the mounting bracket adjacent to the mounting aperture;

a light assembly removeably received in the access aperture, wherein the tool is configured to reach the release aperture through the access aperture.

9. The accessory attachment assembly of claim 1, wherein the release aperture is disposed in the first retention tab, and further wherein the tool is configured to extend through the release aperture and engage the second retention tab to move the second retention tab out of engagement with the open frame portion of the hook member.

10. An accessory attachment assembly for a vehicle interior, comprising:

a mounting bracket having a mounting aperture disposed therethrough;

flexibly resilient retention tabs disposed on the mounting bracket, each retention tab having a free end disposed over the mounting aperture;

a stand-alone hook member having an open frame portion, the open frame portion closely received in the mounting aperture, wherein the retention tabs releasably retain the open frame portion in the mounting aperture; and a release aperture disposed on one of the retention tabs, the release aperture configured to receive a tool for releasing the retention tabs from the open frame portion of the hook member to release the hook member from the mounting bracket.

11. The accessory attachment assembly of claim 10, wherein the open frame portion is received in a snap-fit engagement with the retention tabs.

12. The accessory attachment assembly of claim 10, further including:

an access aperture disposed on the mounting bracket adjacent to the mounting aperture, the access aperture providing access for the tool to the release aperture.

13. An accessory attachment assembly for a vehicle interior, comprising:

a mounting bracket having a mounting aperture disposed therethrough;

first and second retention tabs coupled to and extending outwardly from the mounting bracket, wherein the first and second retention tabs are flexibly resilient over the mounting aperture;

a hook member having a hook portion on a first end and a standoff portion at an opposite second end, the standoff portion having a window therethrough, wherein the standoff portion is received in the mounting aperture of the mounting bracket, such that the first and second retention tabs are releasably coupled to opposite sides of the window of the standoff portion to retain the hook member on the mounting bracket; and a release aperture disposed on one of the first and second retention tabs, the release aperture providing access to the first and second retention tabs for releasing the first and second retention tabs from the window of the standoff portion.

14. The accessory attachment assembly of claim 13, wherein the hook member is a one-piece stand-alone hook member.

15. The accessory attachment assembly of claim 14, wherein the standoff portion comprises a substantially rectangular shaped configuration outwardly extending from the hook portion.

16. The accessory attachment assembly of claim 15, wherein the mounting aperture comprises a substantially rectangular shaped configuration, in which the standoff portion is closely received in an anti-rotational manner.

17. The accessory attachment assembly of claim 16, wherein the standoff portion includes a top wall having an engagement tab disposed thereon.

18. The accessory attachment assembly of claim 17, wherein the mounting aperture includes a top end having a notch, the notch configured to receive the engagement tab in assembly.

* * * * *